3,652,496
VIC-DIHYDRAZONOALKANES AS BIOSTATS IN PLASTICS, PAINTS AND TEXTILES

Christian H. Stapfer, Newtown, Pa., assignor to Cincinnati Milacron Chemicals Inc., Reading, Ohio
No Drawing. Filed June 18, 1969, Ser. No. 834,525
Int. Cl. C08f 45/62; C08g 51/60
U.S. Cl. 260—45.9 R          6 Claims

ABSTRACT OF THE DISCLOSURE

Vic-dihydrazonoalkanes having the formula:

$$\begin{array}{c} RC-CR \\ \parallel \quad \parallel \\ H_2NN \quad NNH_2 \end{array}$$

wherein R is hydrogen or alkyl are used as active biostats for the protection of poly(vinyl halide) formulations as well as other plastic compositions, textiles, coating compositions and paint compositions against fungi and bacteria.

---

This invention relates to the protection of plasticized poly(vinyl halide) formulations as well as other plastics, paints, coatings and textiles against the detrimental effects of microorganisms.

It is well known that a number of fungi and bacteria may cause rapid deterioration of valuable commodities exposed to environments favorable to the growth of these microorganisms.

Thus, the use of plasticized poly(vinyl chloride) compositions is sometimes limited in various applications because of the sensitivity of many of the ingredients entering the composition of such formulations towards microorganisms.

Bacterial contamination causes the deterioration of many plastic, paint and coating compositions and textiles (cellulosic and synthetic) are known to be very sensitive to a wide variety of microorganisms.

In order to obviate these deleterious effects, the industry is using various organic and organometallic compounds which, once introduced into the respective formulations, protect them more or less efficiently against bacteria and fungi. However, most products presently available have the inconvenience of being either toxic to humans or very expensive, or both.

We have found that the dihydrazones of α-diketones of the formula

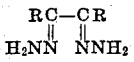

where each R group is H or alkyl having 1 to 8, preferably 1 to 4, carbon atoms, constitute active microbiostats for plastics, textiles, paints and coatings. These dihydrazones are hereinafter generically referred to as vic-dihydrazonoalkanes and include 1,2-dihydrazonoethane, 2,3-dihydrazonobutane which is also known as biacetyl dihydrazone, 2,3-dihydrazonopentane, 2,3-dihydrazonooctane, 4,5-dihydrazonooctane, 2,2,5,5-tetramethyl-3,4-dihydrazonohexane, and the like.

One typical and particularly active compound representative of the invention is biacetyl dihydrazone. It is easily prepared by synthetic methods known to the art, and is soluble in many organic solvents which facilitate its dispersion in the substrate.

The vic-dihydrazonoalkanes are made by well known techniques and a convenient method for making them involves the reaction of the corresponding vic-alkanedione with hydrazine in a molar ratio of about two mols of hydrazine per mol of vic-alkanedione. The reaction is carried out at a temperature of about 50 to about 100° C. and in the presence of a solvent such as methanol, ethanol or butanol. No catalyst is needed for this reaction. The vic-dihydrazonoalkane product is conveniently separated by filtration or recrystallization. Suitable vic-alkanediones for use in the above preparation include 2,3-butanedione; 2,3 - pentanedione; 2,3 - octanedione; 4,5 - octanedione; 2,2,5,5 - tetramethyl - 3,4 - hexanedione, glyoxal and the like. Glyoxal, a dialdehyde, is suitable for the preparation of 1,2-dihydrazonoethane.

The recommended usage levels for protection of flexible PVC as well as paints and textiles may vary between about 0.01 and about 10%, preferably about 0.02 to about 1, based on the weight of the polymeric composition or substrate. Higher amounts can be used although no commensurate increase in protective effect is believed to be obtained.

The harmful effects of microbiological deterioration are due, of course, to the action of microorganisms such as bacteria and fungi on the polymeric composition, particularly on various modifiers commonly added to polymeric compositions, such as, organic glycols including ethylene glycol, propylene glycol, polyoxyethylene glycols, polyoxypropylene glycols, polyoxyethyleneoxypropylene glycols, and the like; monohydrocarbyl and dihydrocarbyl ethers of polyalkylene glycols, e.g., monoethyl, monobutyl, monophenyl, diethyl, dimonyl, di-isobutyl ethers of polyethylene glycol, and the like; organic esters including dioctyl phthalate, diethyl sebacate, octyl decyl adipate, and the like, epoxidized soybean oils, cellulosic derivatives, including carboxymethylcellulose, hydroxyethylcellulose, methyl cellulose, hydroxyethylated starch, ethyl cellulose and the like and in general the plasticizers listed on pages 18 through 45, and other plastic additives described in Modern Plastics Encyclopedia for 1964, New York, N.Y. These additives provide ideal nutrients for microorganisms.

My investigations have shown the vic-dihydrazonoalkanes to be effective against such microorganisms regardless of the type of polymeric composition or the ingredients contained by it. Thus, the present invention can be applied to any polymeric composition which is subject to attack by microorganisms and which is otherwise inert to the vic-dihydrazonoalkane. Typical polymeric compositions to which this invention applies include poly(vinyl halide) resins such as plasticized poly(vinyl chloride) homopolymers, copolymers of vinyl chloride with other ethylenically unsaturated compounds such as vinyl acetate, polyolefins such as polyethylene, polystyrene, ABS copolymers, polyesters, epoxy resins, nitrocellulose resins, vinyl acetate-alkyl acrylate copolymers, vinyl acetate-acrylic acid copolymers, butadiene-styrene copolymers, butadiene-acrylonitrile copolymers, cellulosic fibers including 100% cotton fibers; synthetic fibers such as polyester, polyacrylonitrile, and/or acetate rayon fibers, cellulosic fibers in the form of blends of cotton fibers and synthetic fibers such as those listed above, paper-making fibers and the like. The fibers mentioned above may be in any special form such as textile yarn, woven or knitted textile fabrics, paper or the rawstock forms of same.

The inclusion of the vic-dihydrazonoalkane in the polymeric composition can be carried out in any convenient manner. When thermoplastic polymers are involved, it is convenient to heat or melt the polymer and mill the vic-dihydrazonoalkane into it. When thermosetting polymers are involved, it is most convenient to mix the vic-dihydrazonoalkane into the polymer-forming monomers before curing into the thermoset condition. When fiber, yarn, fabric or paper is concerned, it is convenient to impregnate such substrates with a solution of the vic-dihydrazonoalkane in such solvents as methyl ethyl ketone, dimethyl, formamide, tetrahydrofurane, and the like and then dry the impregnated substrate to remove the solvent.

The following examples are presented. In these examples, all parts and percentages are on a weight basis, mols are on a gram-mol basis and temperatures are on the Fahrenheit scale.

EXAMPLE 1

To a flexible polyvinyl chloride formulation comprising 100 g. of a general purpose poly(vinyl chloride) suspension resin (Geon 101 EP, manufactured by the B. F. Goodrich Co.), 25 g. of dioctyl phthalate plasticizer, 25 g. of epoxidized soybean oil plasticizer, 0.5 g. of stearic acid and 2.0 g. of a barium-cadmium stabilizer, was introduced respectively 0.05, 0.1, 0.25, 0.5 and 1.0 g. of biacetyl dihydrazone. The blends were then processed on a two roll mill for five minutes at 320° F. 1¼ in. square specimens were cut and tested according to Federal Test Method Standard No. 406, Method 6091 (Oct. 5, 1961). In this method, the specimens were placed on nutrient salts agar. The surfaces of the agar and specimens were then inoculated with a composite spore suspension consisting of *Aspergillus niger, Aspergillus flavus, Penicillium funiculosum* and *Trichoderma* sp. The samples were incubated for 21 days at 30° C. and compared for failure to an unprotected sample containing no dihydrazone or other biostats.

The above-mentioned Federal specification considers a biostat as satisfactory in the above described test if no fungus growth is observed on the samples after 21 days of incubation. Presence of fungus growth after 16 days constitutes a failure to protect the sample adequately.

Biacetyl dihydrazone passed the 21 day test at the levels of 0.25, 0.5 and 1.0% whereas the control failed within a few days (less than 4 days).

EXAMPLE 2

One ml. of a one to two day old mixed culture of *Enterobacter aerogenes, Pseudomonas aeroginosa, Bacillus subtillis* and *Escherichia coli* was inoculated into 50 g. of three test coatings as identified below containing respectively for each coating 0.03, 0.06, 0.08, 0.1, 0.2, 0.3 and 0.4 percent (by weight of coating) of biacetyl dihydrozane.

Small aliquots of each coating were transferred to solid agar plates prepared by casting and dehydrating a mixture of 1000 ml. of distilled water, 23 g. of nutrient agar, 8 g. of nutrient broth and a trace of sodium chloride. The plates were cross-hatched with each coating. The plates were then incubated at 30° C. until they showed heavy growth or until two weeks elapsed, whichever came first. The plates were inspected for growth at intervals of 1, 4, 24 and 48 hours and were cross-hatched with each coating after each inspection.

If no growth appears at the 1 and 4 hour intervals, the performance is considered to be excellent. If growth appears at the 1 and 4 hour intervals but no further growth is observed between 4 and 24 hours, the performance is considered to be good. If further growth is observed at the 24 hour inspection, performance is unsatisfactory. The interval within which no further growth is observed is termed the "return to sterility." Table I summarizes the performance of diacetyl dihydrazone in respectively a (1) poly(vinyl acetate) polymer (polymer of 4 wt. parts vinyl acetate and 1 wt. part dibutyl phthalate and maleate such as Flexbond 800, manufactured by the Airco Corp.), (2) a polyacrylate (polymer of 1 wt. part methyl methacrylate and 2 wt. parts ethyl or hexyl acrylate such as Rhoplex AC 34, manufactured by the Rohm & Haas Co.) and a (3) styrene-butadiene copolymer (60 to 80 wt. percent styrene and 20 to 40 wt. percent butadiene such as Dow Chemical's Latex 307 W).

TABLE I

| | Wt. percent dihydrazone | Hours within which plates returned to sterility | Rating |
|---|---|---|---|
| Coating: | | | |
| (1) | 0.08 and above | 24 | Good. |
| (1) | 0.03 to 0.1 | 24 | Do. |
| (2) | 0.2 to 0.4 | 4 | Excellent. |
| (3) | 0.03 to 0.2 | 24 | Good. |
| (3) | 0.3 to 0.4 | 4 | Excellent. |

As a comparison, an unprotected sample shows further growth at the end of each interval up to and including the 48 hour interval.

The following formulations illustrate the ingredients present in polymers 1, 2 and 3:

COATING 1

| | Pounds | Grams |
|---|---|---|
| Methylcellulose 2% (4,000 cps.) | .90 | |
| Tamol 731 (surfactant) manufactured by Rohn and Haas Co. | | 13.6 |
| Ethylene glycol | .12 | |
| Titanium dioxide | 1.65 | |
| Asbestos 3X a pigment extender manufactured by the International Talc Company | .51 | |
| 325 mesh mica | .3 | |
| Water | 1.2 | |
| Diethylene glycol monoethyl ether | | 43.6 |
| Igepal CO 630 (surfactant) manufactured by Antara Chemicals | | 8.17 |
| Anti-foam (1.1 in H$_2$O) a foam reducing agent manufactured by American Cyanamid Co | | 4 |
| Flexbond 800 | 2.35 | |

COATING 2

| | Pounds | Grams |
|---|---|---|
| Water | .96 | |
| Triton CF-10 (surfactant) manufactured by Rohn and Haas Co. | | 8.2 |
| Tamol 731 (surfactant) | | 27.2 |
| Titanium dioxide | 1.05 | |
| Calcium carbonate (Atomite) | 2.25 | |
| Ammonium hydroxide 28% | | 3 |
| Ethylene glycol | .18 | |
| Methylcellulose 2% (4,000 cps.) | .61 | |
| Rhoplex AC-34 | 2.14 | |

COATING 3

| | Pounds | Grams |
|---|---|---|
| Water | .945 | |
| Tamol 731 (surfactant) | | 12.7 |
| Polyglycol P-1200 a commercial polypropylene glycol manufactured by Dow Chemical Company | | 9.1 |
| Titanium dioxide | 1.61 | |
| Clay | .52 | |
| Calcium carbonate | 1.05 | |
| Diethylene glycol | .11 | |
| Methylcellulose 2% (4,000 cps.) | 1.4 | |
| Advawet #33 (surfactant) | | 37.8 |
| Ammonium hydroxide 28% | | 7 |
| Dow latex 307 W | 2.1 | |

EXAMPLE 3

Example 2 was duplicated, using 2,3-dihydrazonopentene as a protective agent. The results were essentially the same as obtained in Example 2 with biacetyl dihydrazone.

When each of 1,2-dihydrazonoethane, 2,3-dihydrazono-octane, 4,5-dihydrazonooctane, and 2,2,5,5-tetramethyl-3,4-dihydrazonohexane is substituted weight for weight for the biacetyl hydrazone in Examples 1 and 2, there results substantially the same microorganism inhibiting effect as obtained in Examples 1 and 2, respectively. Also, when each of these vic-dihydrazonoalkanes and biacetyl hydrazone and 2,3-dihydrazonopentane are applied to cellulosic fabric from solution in tetrahydrofurane and dried, there results excellent inhibiting effects as against the microorganisms identified in Examples 1 and 2.

EXAMPLE 4

Biacetyl dihydrazone is prepared by mixing one mol of biacetyl, two mols of hydrazine hydrate and 1000 grams of ethanol as a solvent. The reaction between biacetyl and dihydrazone is brought about by refluxing the reaction mixture for two hours and filtering. Upon cooling, biacetyl hydrazone crystallized and was found to have a melting point of 158° C.

EXAMPLE 5

2,3-dihydrazonopentane is prepared by mixing one mol of 2,3-pentanedione, two mols of hydrazine and 1000 grams of isopropanol as a solvent. The reaction is brought about by refluxing the reaction mixture for two hours, evaporating off the solvent under vacuum and recrystallizing the obtained 2,3-dihydrazonopentane from hot ethanol.

EXAMPLE 6

In a similar manner as described in Example 5 glyoxal, 2,3-octanedione, 4,5-octanedione and 2,2,5,5-tetramethyl-3,4-hexanedione respectively are substituted on a mol for mol basis for biacetyl to produce respectively 1,2-dihydrazonoethane, 2,3-dihydrazonooctane, 4,5-dihydrazonooctane and 2,2,5,5-tetramethyl-3,4-dihydrazonohexane.

What is claimed is:

1. In a synthetic polymeric composition containing ingredients sensitive to attack of microorganisms, that improvement comprising, the inclusion in said composition, as a protective agent against attack by said microorganisms, of about 0.01 to about 10 wt. percent, based on the weight of said polymeric composition, of a vic-dihydrazonoalkane of the formula:

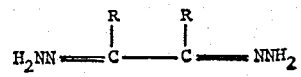

wherein R is selected from the class consisting of hydrogen and alkyl having 1 to 8 carbon atoms.

2. Improvement as claimed in claim 1 wherein said vic-dihydrazonoalkane is biacetyl dihydrazone and said polymeric composition is a synthetic polymer composition.

3. Improvement as claimed in claim 1 wherein said vic-dihydrazonoalkane is biacetyl dihydrazone and said polymeric composition is a plasticized poly(vinyl chloride) composition.

4. Improvement as claimed in claim 1 wherein said vic-dihydrazonoalkane is biacetyl dihydrazone and said polymeric composition is a styrene-butadiene copolymer composition.

5. Improvement as claimed in claim 1 wherein said vic-dihydrazonoalkane is biacetyl dihydrazone and said polymeric composition is a vinyl acetate-acrylic copolymer composition.

6. Improvement as claimed in claim 1 wherein said vic-dihydrazonoalkane is 2,3-dihydrazonopentane.

References Cited

UNITED STATES PATENTS

| 2,844,505 | 7/1958 | Miller et al. | 424—327 |
| 3,446,650 | 5/1969 | Smith | 260—45.9 |

DONALD E. CZAJA, Primary Examiner

E. C. RZUCIDLO, Assistant Examiner

U.S. Cl. X.R.

106—15 AF, 163, 195, 196; 424—327